United States Patent [19]

Falconer et al.

[11] Patent Number: 4,934,977
[45] Date of Patent: Jun. 19, 1990

[54] THERMAL DISCONNECT COUPLING

[75] Inventors: Steven Falconer; James Easter; David Turner, all of Rockford, Ill.

[73] Assignee: Sundstrand Corporation, Rockford, Ill.

[21] Appl. No.: 795,880

[22] Filed: Nov. 7, 1985

[51] Int. Cl.5 .............................................. F16D 9/00
[52] U.S. Cl. ...................................... 464/31; 192/82 T
[58] Field of Search ............. 192/67 R, 82 T; 464/10, 464/17, 30, 31, 38, 39

[56] References Cited

U.S. PATENT DOCUMENTS

| | | | |
|---|---|---|---|
| 2,539,534 | 1/1951 | Eckhardt | 192/82 T X |
| 2,655,015 | 10/1953 | Linder | 464/31 |
| 3,193,068 | 7/1965 | Greve et al. | 192/82 T |
| 3,637,049 | 1/1972 | Butterfield et al. | 184/6.12 |
| 3,675,444 | 7/1972 | Whipple | 464/31 X |
| 3,889,789 | 6/1975 | Boehringer | 464/31 X |
| 4,086,991 | 5/1978 | Swadley | 464/31 X |
| 4,271,947 | 6/1981 | Gaeckle | 464/31 X |
| 4,385,894 | 5/1983 | Sharpe et al. | 464/31 |
| 4,537,578 | 8/1985 | Sharpe et al. | 464/31 |

Primary Examiner—Daniel P. Stodola
Attorney, Agent, or Firm—Wood, Phillips, Mason, Recktenwald & Vansanten

[57] ABSTRACT

Dispersion of eutectic material (56) in a thermal disconnect coupling following thermal actuation is avoided by disposing the body (56) of eutectic material in a first axially opening cavity (40) in a driven shaft (24) having teeth (32) normally meshed with teeth (22) on a driving shaft (16). The first cavity (40) is closed by a wall (50) forming part of an output shaft (26) and the interface of the cavity (40) and the wall (50) is provided with seals (92, 94). The first cavity (40) is separated from a second cavity (42) in the driven shaft (24) by a perforated web (44, 46) and together with an element (60) supported by the output shaft (26) defines second chamber into which the body (56) may flow upon thermal actuation. The interface of the element (60) and the second cavity (42) is provided with seals (92, 94) to prevent the escape of eutectic material from the second chamber.

7 Claims, 2 Drawing Sheets

THERMAL DISCONNECT COUPLING

FIELD OF THE INVENTION

This invention relates to a thermal disconnect coupling for use in a drive train and which is responsive to an overheated condition existing in the system in which it is used to disconnect the source of motive power from the remainder of the system.

BACKGROUND OF THE INVENTION

Thermal disconnect couplings have been utilized in a variety of applications for the purpose of protecting system components from an overheated condition by responding to some predetermined high temperature to operate to disconnect driven components of the system from the source of motive power. A typical application is in the electrical power generation system for an aircraft. In such a system, a generator is ultimately powered by an aircraft engine, frequently via a constant speed drive. The thermal disconnect coupling is typically disposed between the engine and the constant speed drive and is provided with a coolant-lubricant such as hydraulic oil from the constant speed drive. When the coolant-lubricant temperature exceeds some predetermined value, representative of an overheated condition, the coupling acts to break the driving connection between the engine and the constant speed drive.

Most frequently, such thermal disconnect couplings include a driving shaft connected to the engine and a driven shaft connected to a constant speed drive. The two shafts are coupled to each other by interengaging teeth. One of the shafts, most frequently the driven shaft, is movable relative to the driving shaft so as to allow the teeth to disengage to break the driving connection. Movement from the engaged to disengaged position is restrained in normal operation by a body of eutectic material such as solder, having a predetermined melting point that corresponds with the maximum permitted temperature of the lubricant-coolant in the system. Consequently, in normal operation, the body of eutectic material will be in the solid phase and prevent relative movement between the shafts that would result in a breaking of the driving connection. However, when the high temperature limit is exceeded, the body of eutectic material will change to the liquid phase and is then permitted to flow to a location other than its original one, releasing the normally restrained shaft for movement relative to the other to break the driving connection.

The very fact that systems utilize thermal disconnect couplings for system protection makes it implicit that system components are intended to be reused once the connection is re-established after suitable maintenance. In some prior art thermal disconnect couplings, the maintenance chore preliminary to reuse has been complicated by the fact that flow of the eutectic material is not restrained. Consequently, it may enter coolant flow passages in the surrounding area to impede coolant flow or may even flow to bearings to subsequently solidify, ultimately requiring replacement of such bearings as part of the maintenance preliminary to reuse. At the very least, maintenance preliminary to reuse requires the time-consuming removal of such eutectic material that has flowed to the location of interfitting components. One prior art construction that may be subject to such difficulty is illustrated in U.S. Pat. No. 4,086,991 issued May 2, 1978 to Swadley.

In order to avoid these difficulties, the prior art has suggested that the body of eutectic material be contained in a single, sealed chamber having a substantially larger volume than that occupied by the body of eutectic material. Consequently, when the body of eutectic material changes to the liquid phase, it may flow sufficiently within such chamber so as to permit relative movement between the shafts resulting in the decoupling of the same, and yet, be retained within the chamber so as to avoid flow to other parts of the system.

However, because the eutectic material of which such bodies is typically formed is relatively soft, and the typical coupling of this type places the body of eutectic material under compression, the same has a tendency to cold flow, which in turn can result in a disconnection of the drive under normal operating conditions.

To avoid this problem, the prior art has resorted to the placement of relatively stiff wires in the body of eutectic material which are intended to be relatively rigid in compression so long as the body of eutectic material is in the solid phase. Thus, the resulting composite structure can be made sufficiently resistant to cold flow as to prevent inadvertent breaking of the driving connection. A representative example of this type of construction is found in U.S. Pat. No. 4,271,947 issued June 9, 1981 to Gaeckle.

The difficulties with this type of coupling are twofold. Firstly, the forming of the body of eutectic materials with properly oriented wires is a more complicated procedure than would be called for where the body of eutectic material essentially fills a chamber and thus is not subject to cold flowing.

A second difficulty resides in the fact that the chamber, in which the eutectic material is placed, must be of considerably greater volume than that of the eutectic material employed in order to allow the material to flow sufficiently that the relative movement between the shafts may take place to result in disconnection. This in turn increases the overall size of the coupling. The increased size of the coupling frequently is a considerable disadvantage, particularly in aircraft applications where size and weight constraints virtually always exist.

The present invention is directed to overcoming one or more of the above problems.

SUMMARY OF THE INVENTION

It is the principal object of the invention to provide a new and improved thermal disconnect coupling. More specifically, it is an object of the invention to provide such a coupling that is relatively compact in size, whose components are easily manufactured, and which prevents the entry of eutectic material employed in the coupling into other components of the system in which it is used.

An exemplary embodiment of the invention achieves the foregoing objects in a thermal disconnect coupling including a driving shaft having first axially extending coupling teeth. A driven shaft is provided and is coaxial with the driving shaft and to one side thereof. The driven shaft has second axially extending coupling teeth engaged with the first teeth. An output shaft is made coaxial with both the driving and driven shafts and includes an interior cavity which receives the driven shaft and means are provided to interconnect the output shaft and the driven shaft to couple the same against relative rotational movement while allowing relative axial movement so that the driven shaft may move axially away from the driving shaft to disengage the second teeth from the first teeth.

A first chamber is defined by a space between relatively axially movable components of the output and driven shafts and means seal the interface of such relatively axially movable components. A second, closed chamber is disposed in one of the output and the driven shafts adjacent to the first chamber. Means establish fluid communication between the chambers and a body of eutectic material is located in the first chamber.

As a result of this construction, the body of eutectic material may substantially fill the first chamber and is sealed therein save for the possibility of movement to the second chamber. Because the second chamber is likewise closed, upon operation of the coupling to disconnect the driving shaft from the driven shaft, all eutectic material is retained in the chambers and cannot move to other locations within the system to thereby minimize the amount of maintenance required prior to system reuse.

At the same time, such construction avoids any need for complex fabrication of the body of eutectic material as in prior art construction and the same does not require an overly large chamber to contain the eutectic material.

According to a preferred embodiment of the invention, the second chamber is in the driven shaft and there is provided a spring means in the second chamber which is operatively interposed between the output shaft and the driven shaft for biasing the driven shaft axially away from the drive shaft. The body of eutectic material acts against the bias to maintain the first and second teeth in engagement.

The invention contemplates that a bolt be coupled to the output shaft and extend through the chambers to mount a spring housing containing such spring means. The spring means extend from the spring housing into engagement with the driven shaft within the second chamber and the driven shaft is slidably received on the spring housing for axial movement relative thereto. Closing of the second chamber is accomplished by disposing sealing means at the interface of the spring housing and the driven shaft.

The invention also contemplates that the bolt be hollowed to define a coolant flowpath extending through the chambers and that the driven shaft be received in the interior cavity of the output shaft so as to define coolant flowpaths axially adjacent the first chamber oppositely of the second chamber and radially outwardly of the first chamber. As a consequence of this construction, the body of eutectic material is in heat exchange relation with coolant in flowpaths on one side, about its periphery, and extending through its center to be in excellent heat exchange relation with the coolant and rapidly responsive to temperature deviations of the same.

According to the invention, the driven shaft has oppositely axially opening first and second cavities separated by a perforated web. The first chamber is defined by a space in the first cavity between the web and a wall of the interior cavity of the output shaft, while the second chamber is defined by a space in the second cavity between the web and an element carried by the output shaft which closes the second cavity. Fluid communication between the chambers is established by the perforations in the web.

The invention also contemplates a construction wherein the second chamber is defined by a space between relatively axially movable components of the driven and output shaft with the various relatively axially movable components constructed and arranged so that the volume of the second chamber increases as the teeth disengage. This allows the second chamber to be made with a relatively small initial volume and yet be sufficiently enlarged to hold the entire volume of the body of eutectic material when the teeth are fully disengaged.

Other objects and advantages will become apparent from the following specification taken in connection with the accompanying drawings.

DESCRIPTION OF THE PREFERRED EMBODIMENT

Figure 1:
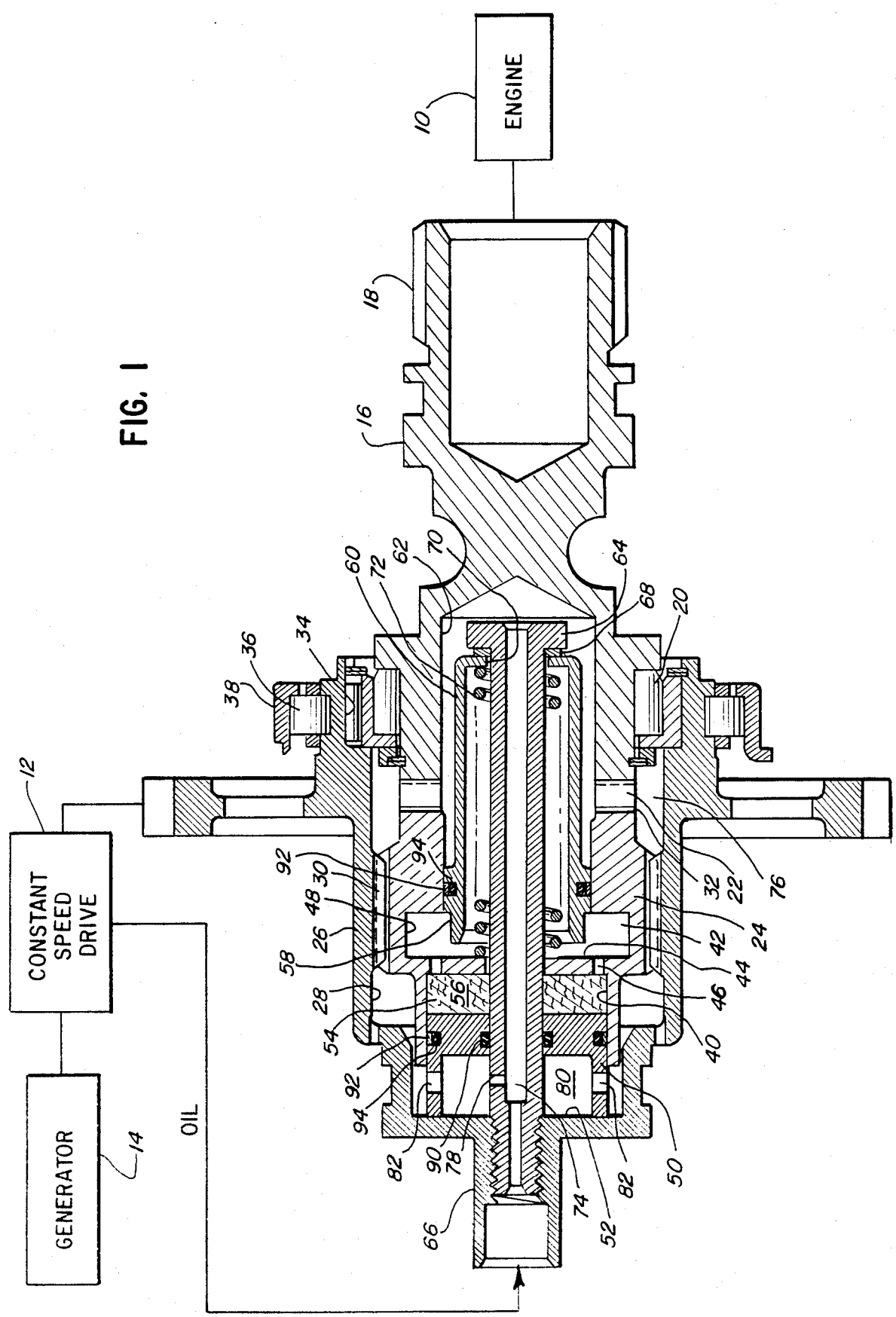
FIG. 1 is a sectional view of a thermal disconnect coupling made according to the invention with the components thereof in their normal operating configuration and showing, in block form, representative system components with which the coupling may be employed.

An exemplary embodiment of a thermal disconnect coupling made according to the invention is illustrated in the drawings and with reference to FIG. 1, the same may be interposed between a source of motive power, such as an engine 10 for an aircraft or the like and a drive system 12 for a generator 14. While the drive system 12 is designated as being a constant speed drive, those skilled in the art will recognize that other types of drive systems could be employed in lieu of constant speed drives and that, for that matter, the use of the coupling of the invention is not restricted to engine driven generator systems.

The engine is coupled to a driving shaft 16 by means of splines 18. The shaft 16 is journaled for rotation about an axis by means of a bearing 20 and, as best seen in FIG. 2, has axially directed teeth 22 at its end remote from the engine 10.

The coupling also includes a driven shaft 24 and an output shaft 26, both being coaxial with the driving shaft 16. The output shaft 26 includes an interior cavity 28 in which the driven shaft 24 is slidably received. About their respective peripheries, the driven shaft 24 and the cavity 28 have interengaging splines 30 which serve to couple the driven shaft 24 to the output shaft 26 for mutual rotation and yet allow the driven shaft 24 to move axially relative to the output shaft 26 in a direction away from the driving shaft 16.

Figure 2:
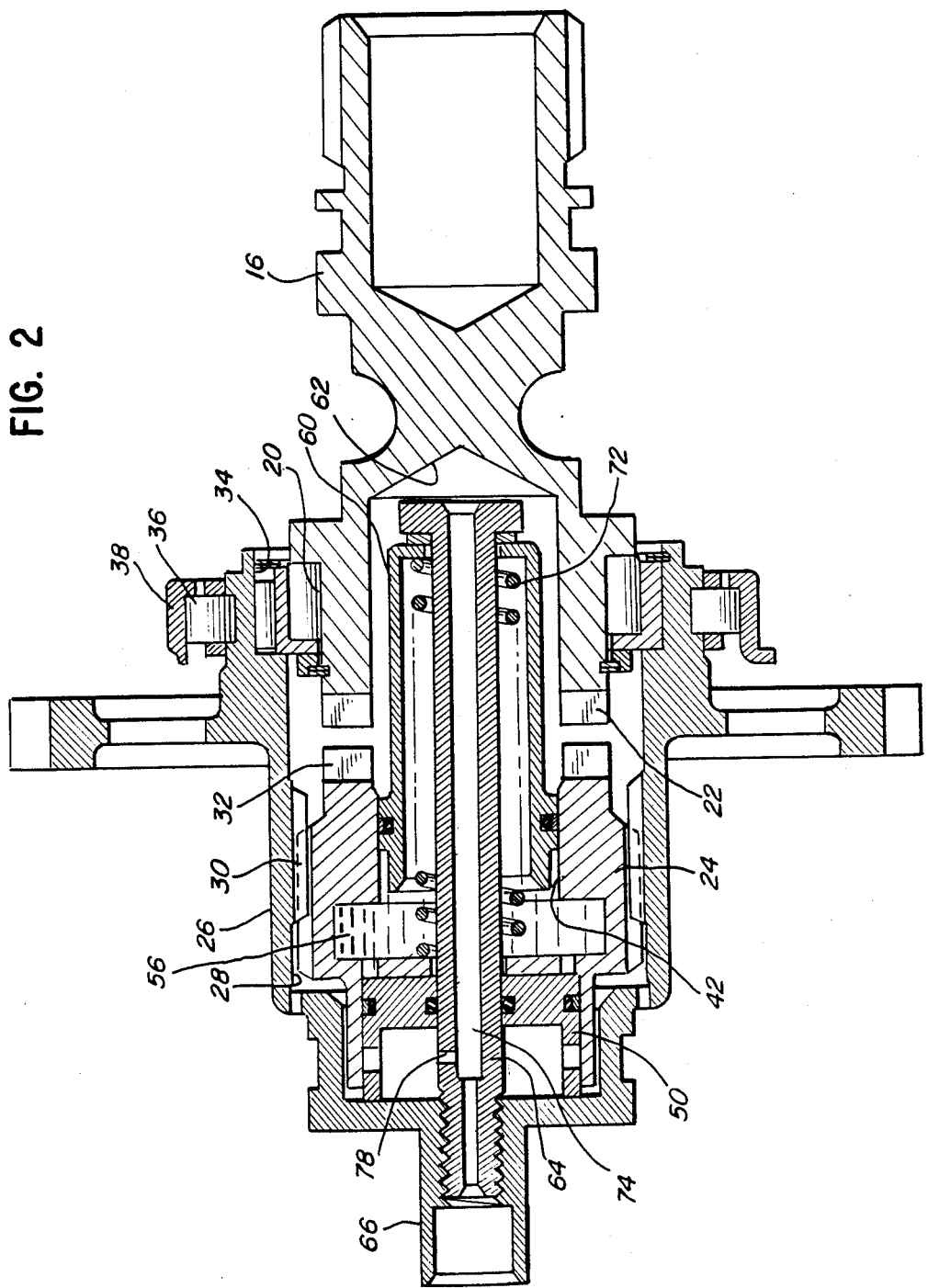
FIG. 2 is a sectional view of the coupling and the relative position of the components following a thermal disconnect.

As seen in FIG. 2, the driven shaft 24, at its end adjacent the driving shaft 16, includes axially directed teeth 32. Comparison of FIGS. 1 and 2 will illustrate that when the components are in the configuration illustrated in FIG. 1, the teeth 22 and 32 will be engaged and a driving connection from the engine to the constant speed drive will be established via the driving shaft 16, the meshed teeth 22 and 32, the driven shaft 24, the interengaging splines 30 and the output shaft 26. However, when the driven shaft 24 has shifted axially to the left as viewed in FIG. 2, the teeth 22 and 32 will no longer be engaged thereby breaking the driving connection from the engine 10 to the constant speed drive 12.

To facilitate disconnection, the so-called "rake angle" of the teeth 22, 32 is such as to create an axially directed separating force which is normally resisted by means to be described.

As seen in FIG. 1, about its mouth, the interior cavity 28 in the output shaft 26 includes a step 34 which receives the bearing 20 journaling the driving shaft 16. Bearings 36 mounted by a housing or the like shown fragmentarily at 38 serve to journal the output shaft 26.

The driven shaft 24 includes first and second, axially oppositely opening cavities 40 and 42 separated by a web 44. Bores or perforations 46 extend through the web 44 to establish fluid communication between the cavities 40 and 42. It will also be observed that immediately adjacent the web 44, the cavity 42 includes an enlarged diameter, interior annulus 48 for purposes to be seen.

The first cavity 40 is closed oppositely of the web 44 in a slidable fashion by a cup-like insert 50 which in effect acts as a wall of the interior cavity 28 of the output shaft 26. That is to say, while the insert 50 is in actuality separate from the main body of the output shaft 26, it is made separate for ease of manufacture and assembly and, for all intents and purposes, may be considered as part of the output shaft 26 by reason of the abuttment of the insert 50 against an end wall 52 of the output shaft 26.

In normal operation of the coupling, there will exist a space 54 defining a first chamber between the web 44 and the wall provided by the insert 50. This space is substantially entirely filled with a body 56 of eutectic material in the solid phase. The eutectic material is chosen according to the temperature limits to which the system is intended to be placed and is such that reaching a predetermined temperature at or below such limit, it will change to the liquid phase.

The annulus 48 forming part of the cavity 24 defines a second chamber together with an end 58 of a spring housing 60. The spring housing 60 extends through the cavity 42 and into an aligned cavity 62 in the driving shaft 16. The spring housing 60 is mounted in the position illustrated by means of a bolt 64 threaded to an integral sleeve 66 forming part of the output shaft 28. A seal 68 is interposed between the head of the bolt 64 and an opening 70 in the spring housing at its end remote from the end 58 and a compression coil spring 72 is disposed in the spring housing 60 to abut the same adjacent the opening 70. The compression coil spring 72 extends from the spring housing at the end 58 to abut the web 44.

As a consequence of this, it will be appreciated that the driven shaft 24 is biased to the left as viewed in the drawing, but is restrained from moving in that direction by the presence of the body 56 of eutectic material within the first chamber 54.

The bolt 64 is hollow as at 74 with the consequence that a lubricant-coolant such as oil in the system may be introduced into the sleeve 66 to flow through the bolt 64 to emerge in the cavity 62 in the driving shaft 16. From this location, it may flow externally of the spring housing 60 to the vicinity of the interengaging teeth 22 and 32 to lubricate the same. The lubricant may also flow through the interface of such teeth to an annular space 76 radially outwardly of the teeth 22, 32 and flow to the bearing 20 to lubricate the same and thereafter to a sump, not shown.

The bolt 64 includes one or more radial passages 78 opening from the hollow 74 to the interior 80 of the cup-shaped insert 50 to establish a flowpath for lubricant-coolant thereto.

The cup-shaped insert 50, in turn, includes a plurality of radial bores 82 which open into the interior cavity 28 of the output shaft.

As a consequence of this configuration, lubricant-coolant flows through the center of the body 56 of eutectic material and is in good heat transfer relation therewith as it flows through the hollow 74 in the bolt 64. It is also placed in good heat exchange relation with one end surface of the body 56 as it flows through the interior 80 of the cup-shaped insert 50. The lubricant-coolant exiting the interior 80 of the cup-shaped insert 50 via the bores 82 flows about the interior of the cavity 28 and thus is further in heat exchange relation with the body 56 of eutectic material radially outwardly thereof prior to flowing through the interengaging splines 30 to the annular space 76. As a consequence of being very nearly surrounded by flowpaths for the lubricant-coolant, the body 56 of eutectic material will quickly assume the temperature of the lubricant-coolant, and when the predetermined temperature is exceeded, melt in response thereto.

Upon melting of the body 56 of eutectic material, the same is free to flow through the perforations or bores 46 in the web 44 into the second chamber defined by the annulus 48 and other components as mentioned previously as the axial separating force existing between the teeth 22 and 32, assisted by the compression coil spring 72, moves the now unrestrained driven shaft 24 to the left until the teeth 22 and 32 separate, that is, from the position illustrated in FIG. 1 to that illustrated in FIG. 2. Once disconnected, the spring 72 prevents reconnection of the teeth 22 and 32. In this connection, it should be noted that in some instances, the coil spring 72 need not be employed since forces existing at the points of contact of the gear teeth 22 with the teeth 32 will continue to cam the driven shaft 24 to the left so long as the body 56 is in the liquid phase.

In order to contain the eutectic material wholly within the first or second chambers defined respectively by the space 54 and the annulus 48, various seals are employed. Where there is no sliding contact between the various components, conventional, high temperature O rings are utilized as, for example, shown at 90 to seal the interface of the bolt 64 and the cup-shaped insert 50. Conversely, if relative sliding movement does occur, conventional so-called glide rings 92 biased by O rings 94 are employed. Such seals are utilized at the interface between the first cavity 40 and the cup-shaped insert 50 and the interface between the spring housing 60 and the second cavity 42. Thus, when the coupling components shift from the position illustrated in FIG. 1 to that illustrated in FIG. 2 and the body 56 of eutectic material flows to the annulus 48 as seen in FIG. 2, it is retained in the latter and prevented from entering other system components.

It should also be observed, in comparing FIGS. 1 and 2, that when the coupling is in the normal operating configuration (FIG. 1) the volume of the second chamber, defined by the annulus 48, the web 44 and spring housing 60, is at first relatively small. However, when a disconnect has occurred with the driven shaft 24 moving to the left, the position illustrated in FIG. 2, it will be appreciated that the volume of the second chamber has increased to a relatively greater volume by reason of the relative partial withdrawal of the spring housing 60 from the second cavity 42. This allows the second chamber to be made of a relatively low initial volume to achieve a space saving and yet have sufficient volume to contain the entire body 56 of eutectic material by reason of the increase in volume of the second chamber that occurs during the disconnect process.

Thus, it will be appreciated that a coupling made according to the invention provides for positive retainment of the eutectic material, preventing the same from inadvertently flowing to other parts of the system after thermal actuation of the coupling. It will also be appreciated that an easily formed body 56 of eutectic material may be employed in lieu of complicated composite structures utilized in various prior art constructions. Finally, it will be appreciated that a large volume for a eutectic material receiving chamber is not required allowing the coupling to be very compact which in turn also contributes to a weight reduction over certain prior art constructions.

We claim:

1. A thermal disconnect coupling comprising
a driving shaft including first axially extending coupling teeth;
a driven shaft coaxial with said driving shaft and to one side thereof, said driven shaft having second axially extending coupling teeth engaged with said first teeth;
an output shaft coaxial with both said driving and driven shafts and including an interior cavity receiving said driven shaft;
means interconnecting said output shaft and said driven shaft to couple the same against relative rotational movement while allowing relative axial movement so that said driven shaft may move axially away from said driving shaft to disengage said second teeth from said first teeth;
a first chamber defined by a space between relatively axially movable components of said output and driven shafts;
means sealing the interface of said relatively axially movable components;
a second closed chamber in one of said output and said driven shafts in adjacency to said first chamber;
means establishing fluid communication between said chambers; and
a body of eutectic material substantially filling said first chamber;
said second chamber being in said driven shaft, and further including spring means in said second chamber and operatively interposed between said output shaft and said driven shaft for biasing said driven shaft axially away from said drive shaft, said body of eutectic material acting against said bias to maintain said teeth in engagement.

2. The thermal disconnect coupling of claim 1 wherein a bolt coupled to said output shaft extends through said chambers to mount a spring housing containing said spring means, said spring means extending from said spring housing into engagement with said driven shaft within said second chamber, said driven shaft further being slidably received on said spring housing for axial movement relative thereto, and sealing means at the interface of said spring housing and said driven shaft said second chamber.

3. The thermal disconnect coupling of claim 2 where said bolt is hollow to define a coolant flow path extending through said chamber and said driven shaft being in said interior cavity so as to define coolant flow paths axially adjacent said first chamber oppositely of said second chamber and radially outwardly of said first chamber whereby said body of eutectic material is in heat exchange relation with coolant flowing in the several said flow paths.

4. A thermal disconnect coupling comprising
a driving shaft including first axially extending coupling teeth;
a driven shaft coaxial with said driving shaft and to one side thereof, said driven shaft having second axially extending coupling teeth engaged with said first teeth end oppositely axially opening first and second cavities separated by a perforated web;
an output shaft coaxial with both said driving and driven shafts and including an interior cavity receiving said driven shaft;
means interconnecting said output shaft and said driven shaft to couple the same against relative rotational movement while allowing relative axial movement so that said driven shaft may move axially away from said driving shaft to disengage said second teeth from said first teeth;
a first chamber defined by a space in said first cavity between said web and a wall of said interior cavity;
means sealing the interface of said first cavity and said wall;
an element carried by said output shaft in spaced relation and closing said second cavity;
a second chamber defined by a space in said second cavity between said web and said element;
sealing means at the interface of said second cavity and said element for sealing said second chamber; and
a body of eutectic material in said first chamber.

5. The thermal disconnect coupling of claim 4 wherein said element is a spring housing opening toward said web; and a compression coil spring in said housing and engaging said web.

6. The thermal disconnect coupling of claim 5 wherein an elongated coolant conduit coupled to said output shaft extends from said output shaft through said chambers to mount said spring housing.

7. A thermal disconnect coupling comprising
a driving shaft including first axially extending coupling teeth;
a driven shaft coaxial with said driving shaft and to one side thereof, said driven shaft having second axially extending coupling teeth engaged with said first teeth.
an output shaft coaxial with both said driving and driven shafts and including an interior cavity receiving said driven shaft;
means interconnecting said output shaft and said driven shaft to couple the same against relative rotational movement while allowing relative axial movement so that said driven shaft may move axially away from said driving shaft to disengage said second teeth from said first teeth;
a first chamber defined by a space between relatively axially movable components of said output and driven shafts;
means sealing the interface of said relatively axially movable components;
a second chamber defined by a space between other relatively axially movable components of said driven and output shafts, said other relatively axially movable components being constructed and arranged so that the volume of said second chamber increases as said teeth disengage;
means sealing the interface of said other relatively axially movable components;
means establishing fluid communication between said chambers; and
a body of eutectic material in said first chamber.

* * * * *